(12) United States Patent
Wheater et al.

(10) Patent No.: US 8,798,941 B2
(45) Date of Patent: Aug. 5, 2014

(54) DIFFERENTIAL PRESSURE SENSOR AND METHOD

(75) Inventors: Chris Wheater, York (GB); Paul Hartley, North Yorkshire (GB); Gavin Jamieson, Homfirth (GB)

(73) Assignee: Norgren Limited, Staffordshire (GB)

( * ) Notice: Subject to any disclaimer, the term of this patent is extended or adjusted under 35 U.S.C. 154(b) by 424 days.

(21) Appl. No.: 13/318,178

(22) PCT Filed: May 6, 2010

(86) PCT No.: PCT/GB2010/000897
§ 371 (c)(1),
(2), (4) Date: Oct. 31, 2011

(87) PCT Pub. No.: WO2010/128289
PCT Pub. Date: Nov. 11, 2010

(65) Prior Publication Data
US 2012/0053860 A1    Mar. 1, 2012

(30) Foreign Application Priority Data

May 6, 2009 (GB) .................................. 0907807.2

(51) Int. Cl.
*G01F 23/14* (2006.01)
*G06F 19/00* (2011.01)
*G01F 1/34* (2006.01)
*G01F 1/36* (2006.01)

(52) U.S. Cl.
CPC . *G01F 1/34* (2013.01); *G01F 1/363* (2013.01)
USPC .............................. 702/47; 73/861.52; 702/50

(58) Field of Classification Search
CPC ........... G01F 1/363; G01P 5/14; G01N 11/08; G01L 7/00; G01L 7/363; G01L 13/06; G01L 15/00
USPC ............ 702/47, 50, 51, 98, 138, 140; 73/714, 73/715, 716, 753, 861.42, 861.52; 137/12
See application file for complete search history.

(56) References Cited

U.S. PATENT DOCUMENTS

| | | | |
|---|---|---|---|
| 3,548,662 A | 12/1970 | Brandau | |
| 4,476,707 A | 10/1984 | Burns et al. | |
| 5,544,529 A | 8/1996 | Mitani et al. | |
| 5,563,351 A | 10/1996 | Miller | |
| 6,945,123 B1* | 9/2005 | Kuehl et al. | 73/861.42 |
| 7,740,024 B2* | 6/2010 | Brodeur et al. | 137/12 |
| 7,962,294 B2* | 6/2011 | Dozoretz et al. | 702/50 |
| 2005/0258959 A1 | 11/2005 | Schnaare et al. | |

FOREIGN PATENT DOCUMENTS

EP    0446920 A2    9/1991

* cited by examiner

*Primary Examiner* — John H Le
(74) *Attorney, Agent, or Firm* — The Ollila Law Group LLC

(57) ABSTRACT

A differential pressure sensor (105) for determining a differential pressure value is provided. The differential pressure sensor (105) includes a selector valve (110) configured to receive a first pressure at a first location and a second pressure at a second location that is spaced-apart from the first location, a single-sided pressure sensor (120) coupled to the selector valve (110) and receiving either the first pressure or the second pressure, and a processing system (130) coupled to the single-sided pressure sensor (120) and configured to receive one or more first single-sided pressure measurements from the single-sided pressure sensor (120), subsequently receive one or more second single-sided pressure measurements from the single-sided pressure sensor (120), and generate the differential pressure value from the one or more first single-sided pressure measurements and the one or more second single-sided pressure measurements.

33 Claims, 8 Drawing Sheets

(56) References Cited

U.S. PATENT DOCUMENTS

DIFFERENTIAL PRESSURE SENSOR AND METHOD

BACKGROUND OF THE INVENTION

1. Field of the Invention

The invention is related to the field of pressure measurement, and more particularly, to an improved differential pressure measurement.

2. Description of the Prior Art

Fluid flow meters are used to measure mass flow rates of flowing fluids, including gasses, liquids, or mixtures thereof. One application of a fluid flow meter is in measuring the mass flow rates of gasses used in semiconductor fabrication. The mass flow rate of such gasses is relatively low. In addition, the pressure may be relatively low. As a result, accurate and reliable measurement of such gas flows is problematic.

FIG. 1 shows a portion of a prior art fluid flow meter employing a differential pressure sensor. The prior art fluid flow meter can employ a venturi (shown) or other flow element that creates a pressure differential in the fluid flow. In the prior art, it has been common to use a differential pressure sensor to measure the pressure difference provided between a reduced pressure generated at the venturi throat and the normal flow pressure upstream or downstream of the venturi throat. The differential pressure sensor generates a differential pressure measurement that can be used to determine an associated mass flow rate of the flow fluid. If the flow rate is zero, then the differential pressure measurement will (or should) be zero.

The differential pressure sensor arrangement of the prior art has drawbacks. A differential pressure sensor typically works well for liquids and flow fluids having significant mass flows and significant flow pressures. This is because the difference in pressures will be significant and therefore easily measurable. However, for low mass flow rates and/or low pressure levels, a differential pressure sensor may not have sufficient sensitivity and accuracy. Differential pressure sensors with satisfactory small differential performance are very costly and therefore are not preferred for a low-flow gas flow meter application.

FIG. 2 shows a portion of a prior art fluid flow meter of an alternate approach. This prior art approach employs two absolute pressure sensors. Two absolute pressure measurements can be used to generate a differential pressure value by subtracting one absolute pressure measurement from the other absolute pressure measurement.

An absolute pressure sensor generates a measurement signal reflecting a quantification of an input pressure with reference to a vacuum. Absolute pressure sensors are available that provide a greater sensitivity and accuracy than a differential pressure sensor. The use of two absolute pressure sensors therefore may produce a more accurate result, as an absolute pressure measurement is easier to accurately obtain than a tiny pressure differential.

The two absolute pressure sensor arrangement of the prior art has drawbacks. The two absolute pressure sensors will need to be closely matched and will need to be calibrated to produce the exact same measurement for a particular pressure. The calibration of the two absolute pressure sensors must remain constant and accurate over the entire operational pressure measurement range. This may require expensive absolute pressure sensors that are manufactured to smaller tolerances. More frequent sensor calibration is consequently required.

In addition, variations in operational tolerances of the two pressure sensors may exist over the entire operational measurement range or only a portion, wherein calibration at a single pressure may not address drift or deviation over the entire operational range. Problematically, the resulting differential pressure value will be in error and in a flow meter application will generate an erroneous mass flow rate output.

What is needed, therefore, is an improved pressure differential measurement.

ASPECTS OF THE INVENTION

In some aspects of the invention, a differential pressure sensor for determining a differential pressure value is provided, the differential pressure sensor comprising:
 a selector valve configured to receive a first pressure at a first location and a second pressure at a second location that is spaced-apart from the first location;
 a single-sided pressure sensor coupled to the selector valve and receiving either the first pressure or the second pressure; and
 a processor coupled to the single-sided pressure sensor and configured to receive one or more first single-sided pressure measurements from the single-sided pressure sensor, subsequently receive one or more second single-sided pressure measurements from the single-sided pressure sensor, and generate the differential pressure value from the one or more first single-sided pressure measurements and the one or more second single-sided pressure measurements.

Preferably, the selector valve comprises a three port, two-way (3/2) selector valve.

Preferably, the selector valve comprises one or more valves.

Preferably, the differential pressure sensor comprises a component of a fluid flow meter.

Preferably, the processor is further configured to control operation of the selector valve.

Preferably, the processor is configured to determine a first absolute pressure value from the one or more first single-sided pressure measurements, determine a second absolute pressure value from the one or more second single-sided pressure measurements, and generate the differential pressure value from the first absolute pressure value and the second absolute pressure value.

Preferably, the processor is configured to process the one or more first single-sided pressure measurements to generate a first best-fit curve, process the one or more second single-sided pressure measurements to generate a second best-fit curve, and generate the differential pressure value from the first best-fit curve and the second best-fit curve.

Preferably, the processor is configured to process the one or more first single-sided pressure measurements to generate a first best-fit curve, process the one or more second single-sided pressure measurements to generate a second best-fit curve, extrapolate a first absolute pressure value at a time point from the first best-fit curve, extrapolate a second absolute pressure value substantially at the time point from the second best-fit curve, and generate the differential pressure value from the first absolute pressure value and the second absolute pressure value.

Preferably, the processor is configured to process the one or more first single-sided pressure measurements to generate a first best-fit curve, process the one or more second single-sided pressure measurements to generate a second best-fit curve, extrapolate a first absolute pressure value at a first time point from the first best-fit curve, extrapolate a second absolute pressure value at a predetermined second time point from the second best-fit curve, wherein the first time point is within a predetermined time range of the second time point, and generate the differential pressure value from the first absolute pressure value and the second absolute pressure value.

Preferably, the processor is configured to determine and discard outliers in the one or more first single-sided pressure measurements to produce one or more processed first single-sided pressure measurements, statistically process the one or more processed first single-sided pressure measurements to determine a first best-fit curve, determine and discard outliers in the one or more second single-sided pressure measurements to produce one or more processed first single-sided pressure measurements, statistically process the one or more processed second single-sided pressure measurements to determine a second best-fit curve, extrapolate a first absolute pressure value at a time point from the first best-fit curve, extrapolate a second absolute pressure value substantially at the time point from the second best-fit curve, and generate the differential pressure value from the first absolute pressure value and the second absolute pressure value.

Preferably, the processor is configured to determine and discard outliers in the one or more first single-sided pressure measurements to produce one or more processed first single-sided pressure measurements, statistically process the one or more processed first single-sided pressure measurements to determine a first best-fit curve, determine and discard outliers in the one or more second single-sided pressure measurements to produce one or more processed first single-sided pressure measurements, statistically process the one or more processed second single-sided pressure measurements to determine a second best-fit curve, extrapolate a first absolute pressure value at a first time point from the first best-fit curve, extrapolate a second absolute pressure value at a predetermined second time point from the second best-fit curve, wherein the first time point is within a predetermined time range of the second time point, and generate the differential pressure value from the first absolute pressure value and the second absolute pressure value.

Preferably, the generating further comprises inferring first trend data from the one or more first single-sided pressure measurements and inferring second trend data from the one or more second single-sided pressure measurements and using the first trend data and the second trend data in generating the differential pressure value.

In some aspects of the invention, a method for determining a differential pressure value is provided, the method comprising:
  measuring one or more first single-sided pressure measurements;
  subsequently measuring one or more second single-sided pressure measurements, with the one or more first single-sided pressure measurements and the one or more second single-sided pressure measurements being measured by a single single-sided pressure sensor; and
  generating the differential pressure value from the one or more first single-sided pressure measurements and the one or more second single-sided pressure measurements.

Preferably, the generating further comprises determining a first absolute pressure value from the one or more first single-sided pressure measurements, determining a second absolute pressure value from the one or more second single-sided pressure measurements, and generating the differential pressure value from the first absolute pressure value and the second absolute pressure value.

Preferably, the generating further comprises processing the one or more first single-sided pressure measurements to generate a first best-fit curve, processing the one or more second single-sided pressure measurements to generate a second best-fit curve, and generating the differential pressure value from the first best-fit curve and the second best-fit curve.

Preferably, the generating further comprises processing the one or more first single-sided pressure measurements to generate a first best-fit curve, processing the one or more second single-sided pressure measurements to generate a second best-fit curve, extrapolating a first absolute pressure value at a time point from the first best-fit curve, extrapolating a second absolute pressure value substantially at the time point from the second best-fit curve, and generating the differential pressure value from the first absolute pressure value and the second absolute pressure value.

Preferably, the generating further comprises processing the one or more first single-sided pressure measurements to generate a first best-fit curve, processing the one or more second single-sided pressure measurements to generate a second best-fit curve, extrapolating a first absolute pressure value at a first time point from the first best-fit curve, extrapolating a second absolute pressure value at a predetermined second time point from the second best-fit curve, wherein the first time point is within a predetermined time range of the second time point, and generating the differential pressure value from the first absolute pressure value and the second absolute pressure value.

Preferably, the generating further comprises determining and discarding outliers in the one or more first single-sided pressure measurements to produce one or more processed first single-sided pressure measurements, statistically processing the one or more processed first single-sided pressure measurements to determine a first best-fit curve, determining and discarding outliers in the one or more second single-sided pressure measurements to produce one or more processed first single-sided pressure measurements, statistically processing the one or more processed second single-sided pressure measurements to determine a second best-fit curve, extrapolating a first absolute pressure value at a time point from the first best-fit curve, extrapolating a second absolute pressure value substantially at the time point from the second best-fit curve, and generating the differential pressure value from the first absolute pressure value and the second absolute pressure value.

Preferably, the generating further comprises determining and discarding outliers in the one or more first single-sided pressure measurements to produce one or more processed first single-sided pressure measurements, statistically processing the one or more processed first single-sided pressure measurements to determine a first best-fit curve, determining and discarding outliers in the one or more second single-sided pressure measurements to produce one or more processed first single-sided pressure measurements, statistically processing the one or more processed second single-sided pressure measurements to determine a second best-fit curve, extrapolating a first absolute pressure value at a first time point from the first best-fit curve, extrapolating a second absolute pressure value at a predetermined second time point from the second best-fit curve, wherein the first time point is within a predetermined time range of the second time point, and generating the differential pressure value from the first absolute pressure value and the second absolute pressure value.

Preferably, the generating further comprises inferring first trend data from the one or more first single-sided pressure measurements and inferring second trend data from the one or more second single-sided pressure measurements and using the first trend data and the second trend data in generating the differential pressure value.

In some aspects of the invention, a method for determining a differential pressure value is provided, the method comprising:
> measuring a plurality of first absolute pressures;
> subsequently measuring a plurality of second absolute pressures, with the plurality of first absolute pressures and the plurality of second absolute pressures being measured by a single single-sided pressure sensor;
> determining a first absolute pressure value from the plurality of first single-sided pressure measurements;
> determining a second absolute pressure value from the plurality of second single-sided pressure measurements; and
> generating the differential pressure value from the first absolute pressure value and the second absolute pressure value.

Preferably, the generating further comprises processing the plurality of first single-sided pressure measurements to generate a first best-fit curve, processing the plurality of second single-sided pressure measurements to generate a second best-fit curve, and generating the differential pressure value from the first best-fit curve and the second best-fit curve.

Preferably, the generating further comprises processing the plurality of first single-sided pressure measurements to generate a first best-fit curve, processing the plurality of second single-sided pressure measurements to generate a second best-fit curve, extrapolating a first absolute pressure value at a time point from the first best-fit curve, extrapolating a second absolute pressure value substantially at the time point from the second best-fit curve, and generating the differential pressure value from the first absolute pressure value and the second absolute pressure value.

Preferably, the generating further comprises processing the plurality of first single-sided pressure measurements to generate a first best-fit curve, processing the plurality of second single-sided pressure measurements to generate a second best-fit curve, extrapolating a first absolute pressure value at a first time point from the first best-fit curve, extrapolating a second absolute pressure value at a predetermined second time point from the second best-fit curve, wherein the first time point is within a predetermined time range of the second time point, and generating the differential pressure value from the first absolute pressure value and the second absolute pressure value.

Preferably, the generating further comprises determining and discarding outliers in the plurality of first single-sided pressure measurements to produce a plurality of processed first single-sided pressure measurements, statistically processing the plurality of processed first single-sided pressure measurements to determine a first best-fit curve, determining and discarding outliers in the plurality of second single-sided pressure measurements to produce a plurality of processed first single-sided pressure measurements, statistically processing the plurality of processed second single-sided pressure measurements to determine a second best-fit curve, extrapolating a first absolute pressure value at a time point from the first best-fit curve, extrapolating a second absolute pressure value substantially at the time point from the second best-fit curve, and generating the differential pressure value from the first absolute pressure value and the second absolute pressure value.

Preferably, the generating further comprises determining and discarding outliers in the plurality of first single-sided pressure measurements to produce a plurality of processed first single-sided pressure measurements, statistically processing the plurality of processed first single-sided pressure measurements to determine a first best-fit curve, determining and discarding outliers in the plurality of second single-sided pressure measurements to produce a plurality of processed first single-sided pressure measurements, statistically processing the plurality of processed second single-sided pressure measurements to determine a second best-fit curve, extrapolating a first absolute pressure value at a first time point from the first best-fit curve, extrapolating a second absolute pressure value at a predetermined second time point from the second best-fit curve, wherein the first time point is within a predetermined time range of the second time point, and generating the differential pressure value from the first absolute pressure value and the second absolute pressure value.

Preferably, the generating further comprises inferring first trend data from the one or more first single-sided pressure measurements and inferring second trend data from the one or more second single-sided pressure measurements and using the first trend data and the second trend data in generating the differential pressure value.

In some aspects of the invention, a method for determining a differential pressure value is provided, the method comprising:
> measuring a plurality of first absolute pressures;
> subsequently measuring a plurality of second absolute pressures, with the plurality of first absolute pressures and the plurality of second absolute pressures being measured by a single single-sided pressure sensor;
> generating a first best-fit curve from the plurality of first single-sided pressure measurements and using the first best-fit curve to determine a first absolute pressure value;
> generating a second best-fit curve from the plurality of second single-sided pressure measurements and using the second best-fit curve to determine a second absolute pressure value; and
> generating the differential pressure value from the first absolute pressure value and the second absolute pressure value.

Preferably, generating the first and second best-fit curves further comprises extrapolating a first absolute pressure value at a time point from the first best-fit curve, and extrapolating a second absolute pressure value substantially at the time point from the second best-fit curve.

Preferably, generating the first and second best-fit curves further comprises extrapolating a first absolute pressure value at a first time point from the first best-fit curve, and extrapolating a second absolute pressure value at a predetermined second time point from the second best-fit curve, wherein the first time point is within a predetermined time range of the second time point.

Preferably, the generating further comprises determining and discarding outliers in the plurality of first single-sided pressure measurements to produce a plurality of processed first single-sided pressure measurements before generating the first best-fit curve, determining and discarding outliers in the plurality of second single-sided pressure measurements to produce a plurality of processed first single-sided pressure measurements before generating the second best-fit curve, extrapolating the first absolute pressure value at a time point from the first best-fit curve, and extrapolating the second absolute pressure value substantially at the time point from the second best-fit curve.

Preferably, the generating further comprises determining and discarding outliers in the plurality of first single-sided pressure measurements to produce a plurality of processed first single-sided pressure measurements before generating the first best-fit curve, determining and discarding outliers in the plurality of second single-sided pressure measurements to produce a plurality of processed first single-sided pressure measurements before generating the second best-fit curve, extrapolating a first absolute pressure value at a first time point from the first best-fit curve, and extrapolating a second absolute pressure value at a predetermined second time point from the second best-fit curve, wherein the first time point is within a predetermined time range of the second time point.

Preferably, the generating further comprises inferring first trend data from the one or more first single-sided pressure measurements and inferring second trend data from the one or more second single-sided pressure measurements and using the first trend data and the second trend data in generating the differential pressure value.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 1-10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
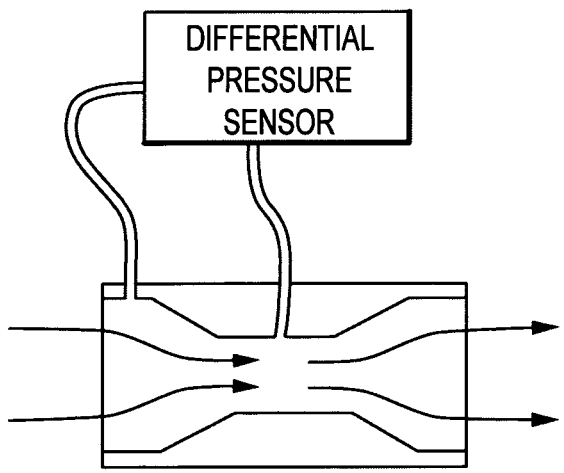
FIG. 1 shows a portion of a prior art fluid flow meter employing a differential pressure sensor.
Figure 2:
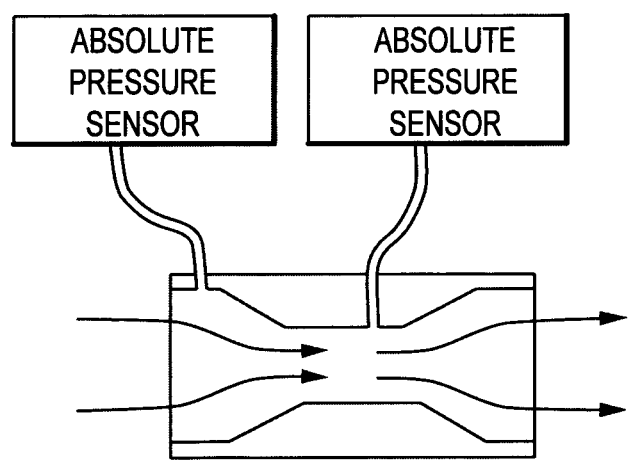
FIG. 2 shows a portion of a prior art fluid flow meter of an alternate approach.
Figure 3:
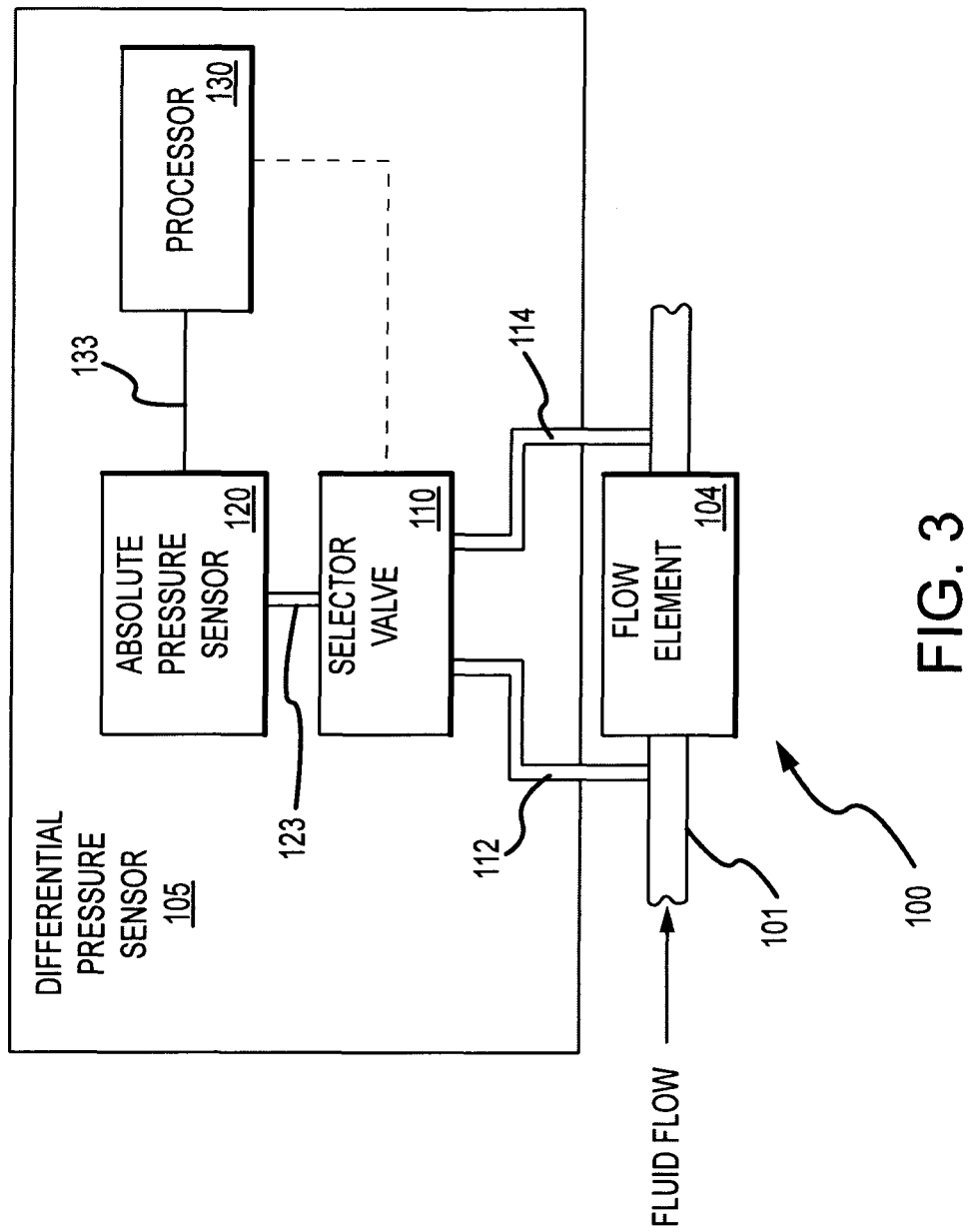
FIG. 3 shows a differential pressure sensor according to the invention.

FIG. 3 shows a differential pressure sensor 105 according to the invention. The differential pressure sensor 105 generates a differential pressure value of a fluid, such as a differential in pressures between a first location and a second location that is spaced-apart from the first location, or otherwise exhibits a differential in fluid pressure. The two locations may or may not have the same fluid present. A differential pressure value according to the invention is not directly generated and instead is generated from absolute pressure values.

The differential pressure sensor 105 in some embodiments comprises a component of a fluid flow meter 100, as shown. The fluid flow meter 100 can include a flow element 104, wherein the differential pressure sensor 105 measures a differential pressure created by the flow element 104. The differential pressure sensor 105 can generate differential pressure values that can be used by the fluid flow meter 100 to produce fluid mass flow rate values, for example. However, it should be understood that the differential pressure sensor 105 can be used in any manner and is not limited to a particular implementation.

The fluid can comprise any gas, liquid, or combination thereof. The fluid can flow at any pressure or at any flow rate. However, the fluid flow meter 100 may be especially suited for measuring low mass and/or low pressure flows, such as gasses being used in manufacturing. For example, the fluid flow meter 100 can accurately and economically measure gas flows used in semiconductor fabrication.

The differential pressure sensor 105 includes a selector valve 110, a single-sided pressure sensor 120, and a processing system 130. The selector valve 110 is connected to first and second locations of the flow element 104 by a first conduit 112 and a second conduit 114 that communicate first and second pressures to the selector valve 110. The single-sided pressure sensor 120 is connected to the selector valve 110 by a measurement conduit 123. The processing system 130 is electrically coupled to the single-sided pressure sensor 120 by one or more conductors 133 and receives electrical pressure measurements therefrom. In addition, in some embodiments the processing system 130 may be coupled to the selector valve 110 by any manner of electrical, pneumatic, optical, or other feedback and/or control members.

The flow element 104 can comprise any manner of flow element that exhibits a pressure difference over a flow span. Consequently, the flow element 104 can include a venturi, orifice, or other flow device that interacts with the fluid flow to create a pressure difference or pressure drop. For a flowing fluid, the pressure difference can be used to calculate a mass flow rate. The first conduit 112 and the second conduit 114 can therefore be connected to the flow element 104 at locations where the pressure difference exists.

It should be understood that the before and after locations of the first and second conduits 112 and 114 shown in the figure may be varied. For example, the first conduit 112 or the second conduit 114 may be located anywhere between the inlet and outlet ends of the flow element 104. In a venturi embodiment, one of the first conduit 112 or the second conduit 114 can be located in the throat of the venturi, at a low pressure location. However, it should be understood that the flow element 104 can increase or decrease the fluid pressure, and the conduit will be located at a location of affected pressure. The other conduit can be located upstream or downstream of the affected pressure location. As a result, the first conduit 112 and the second conduit 114 measure a pressure differential of the fluid between the fluid conduit 101 and the venturi throat (or other pressure-affecting device).

The selector valve 110 is configured to selectively connect either the first conduit 112 or the second conduit 114 to the single-sided pressure sensor 120. As a result, either a first pressure is received in the single-sided pressure sensor 120 from the first conduit 112 or a second pressure is received from the second conduit 114. The selector valve 110 can switch between connecting either the first conduit 112 or the second conduit 114 to the measurement conduit 123. The selector valve 110 can connect the two conduits 112 and 114 for equal or differing switching times and time periods.

The selector valve 110 can comprise any valve capable of selectively connecting either the first conduit 112 or the second conduit 114 to the single-sided pressure sensor 120. The selector valve 110 can include a power actuation, such as a mechanical input, a solenoid, or a pneumatic actuator. However, other valve types are contemplated and are within the scope of the description and claims.

The selector valve 110 can comprise one or more suitable valves. A three port, two-way valve (i.e., a 3/2 valve) is shown in the figure and can selectively connect one of two input ports to the output port. However, it should be understood that other valves, and even other combinations of valves, are contemplated and are within the scope of the description and claims.

The single-sided pressure sensor 120 can comprise any suitable pressure sensor. In some embodiments, the single-sided pressure sensor 120 can be an absolute pressure sensor that measures a difference between the sensed pressure and a vacuum. In other embodiments, the single-sided pressure sensor 120 can be a gauge pressure sensor that measures a difference between the sensed pressure and an ambient pressure. The single-sided pressure sensor 120 may have a measurement range selected to correspond to a predetermined flow fluid in some embodiments. The single-sided pressure sensor 120 in some embodiments generates an electrical measurement signal substantially corresponding to a measured absolute pressure.

The processing system 130 is coupled to the single-sided pressure sensor 120 and receives measurements from the single-sided pressure sensor 120. The processing system 130 can comprise a system configured to perform the operations described herein. The processing system 130 can include a programmable chip including some or all of the required electrical components. Alternatively, the processing system 130 can comprise a system of discrete components including circuitry configured to perform the needed operations. The measurements can comprise first and second pressure measurements, wherein the first and second pressure measurements are received over subsequent time periods. The processing system 130 can store measurements and can store values generated from the measurements. The processing system 130 is configured to process the single-sided pressure measurements and generate differential pressure values.

Under control of the processing system 130, the differential pressure sensor 105 can measure a plurality of first absolute pressures of a fluid at a first location (i.e., at a first location with respect to a venturi, for example), measure a plurality of second absolute pressures at a second location, and generate a differential pressure value. The processing system 130 can be configured to control the selector valve 110 and process measurements according to multiple methods and algorithms, such as those shown in FIGS. 4, 6, and 8 and discussed below.

The processing system 130 can be coupled to the selector valve 110 and may be configured to control the selector valve 110, wherein the processing system 130 can command the selector valve 110 to connect the measurement conduit 123 to either the first conduit 112 or the second conduit 114. In addition, the processing system 130 can optionally receive valve positional feedback from the selector valve 110 in some embodiments.

Figure 4:
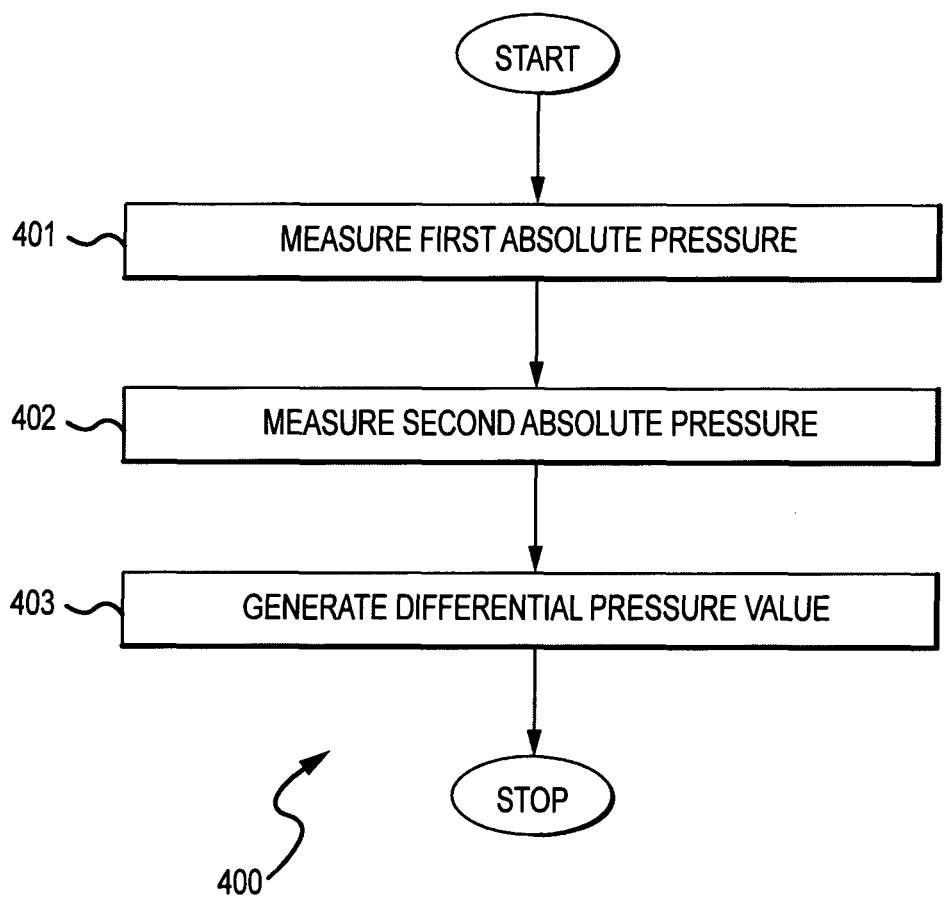
FIG. 4 is a flowchart of a method for determining a differential pressure value according to the invention.

FIG. 4 is a flowchart 400 of a method for determining a differential pressure value according to the invention. In step 401, a first single-sided pressure measurement is obtained. The first single-sided pressure measurement is obtained from a first location. The first single-sided pressure measurement can comprise one or more first single-sided pressure measurements.

In step 402, a second single-sided pressure measurement is obtained. The second single-sided pressure measurement is obtained from a second location. The second single-sided pressure measurement can comprise one or more second single-sided pressure measurements. The second single-sided pressure measurement is generated after the second pressure is connected to the single-sided pressure sensor. In order to generate a meaningful differential pressure, the second location is generally spaced-apart from the first location.

In step 403, a differential pressure value is generated from the one or more first single-sided pressure measurements and the one or more second single-sided pressure measurements. The generation can comprise a subtraction of one absolute pressure value from the other value, with the subtraction order being dictated by the locations of the first conduit 112 and the second conduit 114 in the flow element 104. The one or more first single-sided pressure measurements and the one or more second single-sided pressure measurements can first be processed in some manner in order to obtain a representative first absolute pressure value and a representative second absolute pressure value.

The valve cycle can be varied according to conditions, including the fluid of the fluid flow, the mass flow rate and pressure of the fluid flow, the characteristics of the selector valve 110, and the desired accuracy of the measurements. If the fluid flow is steady, periodic measurements may be satisfactory. Generally, the differential pressure value can be produced at a rate determined by the cycling of the selector valve 110, after the one or more first single-sided pressure measurements and the one or more second single-sided pressure measurements are obtained.

The valve switching times can be varied as needed or desired. As a result, accurate and reliable differential pressure values can be generated without an unacceptably short valve life. Faster switching times will result in more frequent production of differential pressure values. However, faster switching times may result in more valve wear. Consequently, the switching time may be a compromise between more frequently produced and more accurate differential pressure values and the desired valve wear and valve life. For example, in some embodiments the selector valve 110 may connect each of the conduits 112 and 114 for five to ten seconds. However, it should be understood that other valve switching times are contemplated and are within the scope of the description and claims.

Figure 5:
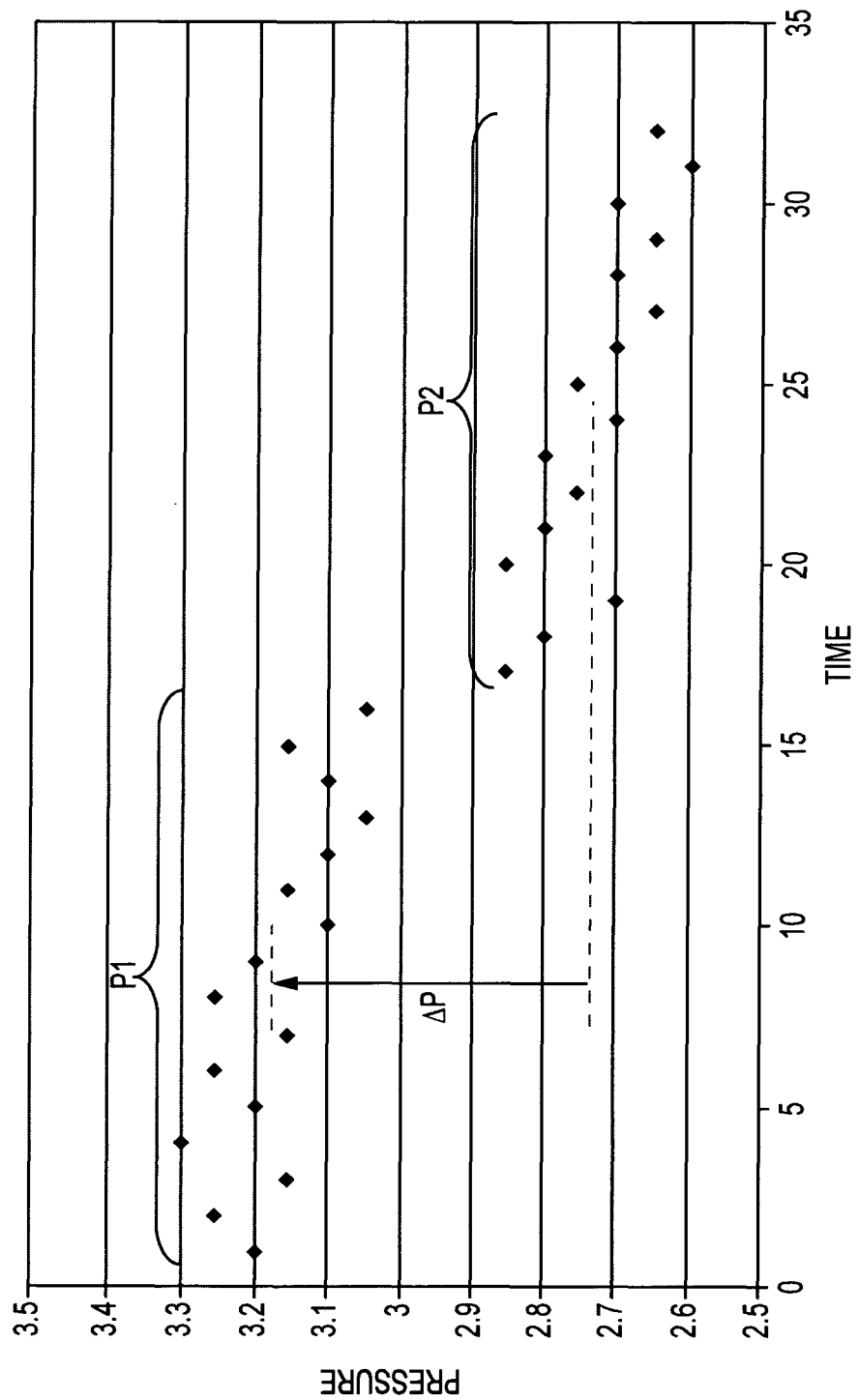
FIG. 5 is a graph of first and second single-sided pressure measurements in one example of operation.

FIG. 5 is a graph of first and second single-sided pressure measurements in one example of operation. In this example, the plurality of first single-sided pressure measurements (P1) and the plurality of second single-sided pressure measurements (P2) are processed to produce representative first and second absolute pressure values. The processing can include any manner of average, weighted average, integration, or other operation that produces a substantially representative single pressure value.

For a relatively steady state, such processing may be satisfactory. Both the first pressure point and the second pressure point are fairly representative of the pluralities of first and second single-sided pressure measurements. The accuracy and reliability may be increased, if needed, through higher sampling rates (i.e., smaller valve switching time periods). However, a frequent valve switching may not be acceptable in some embodiments. Because valves are typically designed for a specified number of valve cycles over the life of the valve, more frequent valve switching will result in a shorter valve life.

Figure 6:
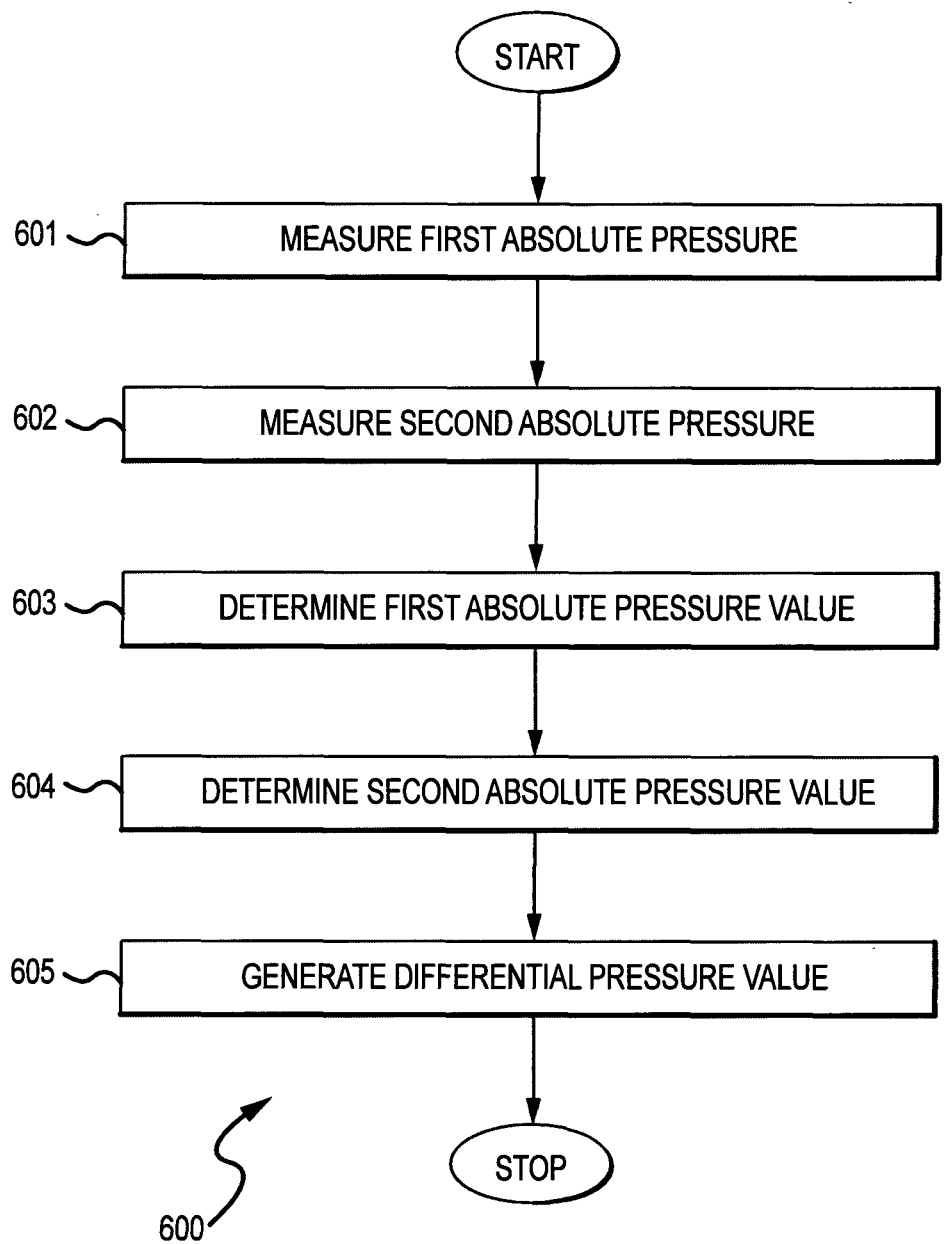
FIG. 6 is a flowchart of a method for determining a differential pressure value according to the invention.

FIG. 6 is a flowchart 600 of a method for determining a differential pressure value according to the invention. In step 601, a plurality of first single-sided pressure measurements are obtained. The first measurements are obtained over a first time period.

In step 602, a plurality of second single-sided pressure measurements are obtained. The second measurements are obtained over a second time period (i.e., the selector valve has changed from the first conduit to the second conduit).

In step 603, a first absolute pressure value is determined from the plurality of first single-sided pressure measurements. The first absolute pressure value therefore represents a best first single-sided pressure measurement. The first absolute pressure value can be determined by suitable processing such as averaging or finding a centroid, integration, or other suitable method or algorithm.

In step 604, a second absolute pressure value is determined from the plurality of second single-sided pressure measurements, as discussed above.

In step 605, the first absolute pressure value and the second absolute pressure value are used to generate the differential pressure value. As shown in the graph of FIG. 5, processing the first and second measurements to generate representative first and second absolute pressure values may work acceptably well where the fluid flow is substantially stable and does not exhibit rapid or large changes in pressure values.

Figure 7:
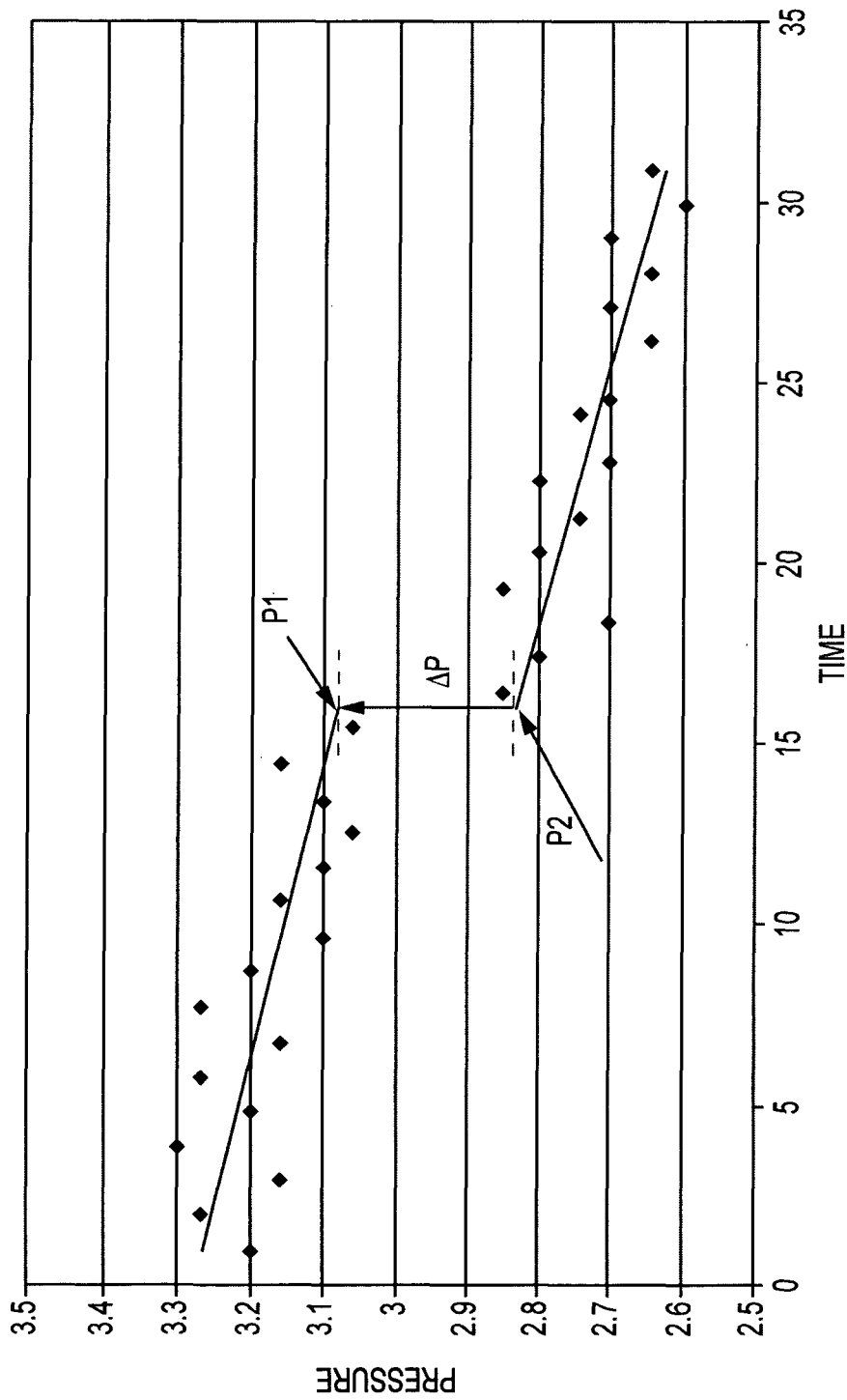
FIG. 7 is a graph of first and second single-sided pressure measurements in another example of operation.

FIG. 7 is a graph of first and second single-sided pressure measurements in another example of operation. As in the previous graph, a plurality of first absolute pressures and a plurality of second absolute pressures have been measured. Here, the first and second pressures have been processed to generate a first best-fit and a second best-fit curve. The curves may be substantially linear, as shown, or may be non-linear.

In order to produce a substantially instantaneous differential pressure value, it is advantageous that the derived first and second absolute pressure values are from the same instant in time. Otherwise, the differential pressure value will not be accurate. Therefore, at a particular point in time, first and second absolute pressure values P1 and P2 are derived from the first best-fit curve and from the second best-fit curve. The first best-fit curve and the second best-fit curve include values taken over time, so they are much more accurate than a single instantaneous measurement. Further, rapid changes in the pressure measurements are captured and can be taken into account. The result is a more accurate differential pressure value.

Figure 8:
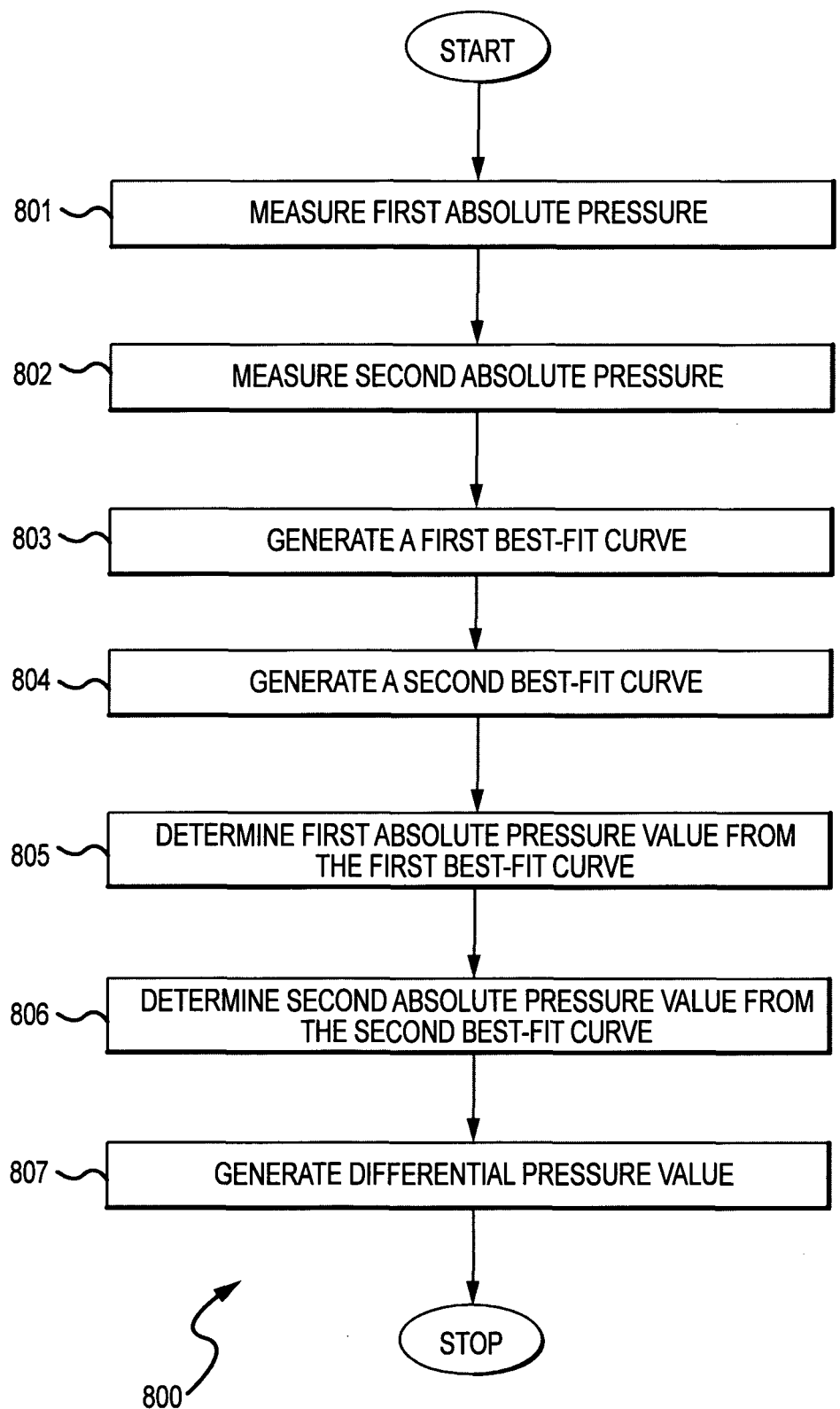
FIG. 8 is a flowchart of a method for determining a differential pressure value according to the invention.

FIG. 8 is a flowchart 800 of a method for determining a differential pressure value according to the invention. In step 801, a plurality of first single-sided pressure measurements are obtained.

In step 802, a plurality of second single-sided pressure measurements are obtained.

In step 803, a first best-fit curve is generated from the plurality of first single-sided pressure measurements. The first best-fit curve can be substantially linear or can be non-linear. The first best-fit curve can be generated using any manner of curve-fitting method or algorithm.

The first best-fit curve can reflect trends in the measurement data. A best-fit curve therefore can be at least somewhat predictive of a trend in the pressure being measured. This predictive aspect can be used where an absolute pressure value (or values) may need to be extrapolated.

In step 804, a second best-fit curve is generated from the plurality of second single-sided pressure measurements, as discussed above.

In step 805, a first absolute pressure value is determined from the first best-fit curve. The determining can include extrapolation of the data at a particular time point. For example, the first best-fit curve can be extended by extrapolating a first absolute pressure value that extends time-wise beyond the span of actual pressure measurements. Alternately, extrapolation (or other processing, including interpolation) can be used to generate a better value of pressure at about the valve switching time, where the valve switching action may affect the pressure measurement. For example, the beginning of valve movement with respect to a pressure currently being measured may cause the measured pressure to increase or decrease, depending on the configuration of the valve or valves, the configuration of the conduits, or other factors. Consequently, the best-fit curve may provide a more accurate absolute pressure value.

In step 806, a second absolute pressure value is determined from the second best-fit curve, as described above for the first absolute pressure value.

The first and second absolute pressure values can be generated for substantially the same time point, as shown in points P1 and P2 in the graph of FIG. 7, which are substantially vertically aligned. There will be none or almost no time difference between the first absolute pressure value P1 and the second absolute pressure value P2 as a result.

Alternatively, the first and second absolute pressure values can be chronologically separated by a predetermined time range. This may be done where, for example, measurement data may be missing near the valve switching point or may be too variable at the valve switching point. Consequently, the first absolute pressure value P1 and the second absolute pressure value P2 can be chosen to be within a predetermined time range from each other or from the valve switching point.

In step 807, a differential pressure value is generated from the first absolute pressure value and the second absolute pressure value. The generation can comprise a subtraction of one absolute pressure value from the other value, as previously discussed.

In some embodiments, the pressure measurement can additionally be used to infer trend data for each set of pressure measurements. The gradient or slope of each best-fit curve can be found from the trend data. The gradient can be used for indicating the rate of change or stability in the measure pressure. A large gradient may indicate that the pressure is changing rapidly. The resulting first and second gradient can be used in generating a subsequent differential pressure value. For example, the first and second trend data can be used in determining outliers and for other statistical processing of the pressure measurements. The first and second trend data can further be used in processing subsequent data iterations.

Figure 9:
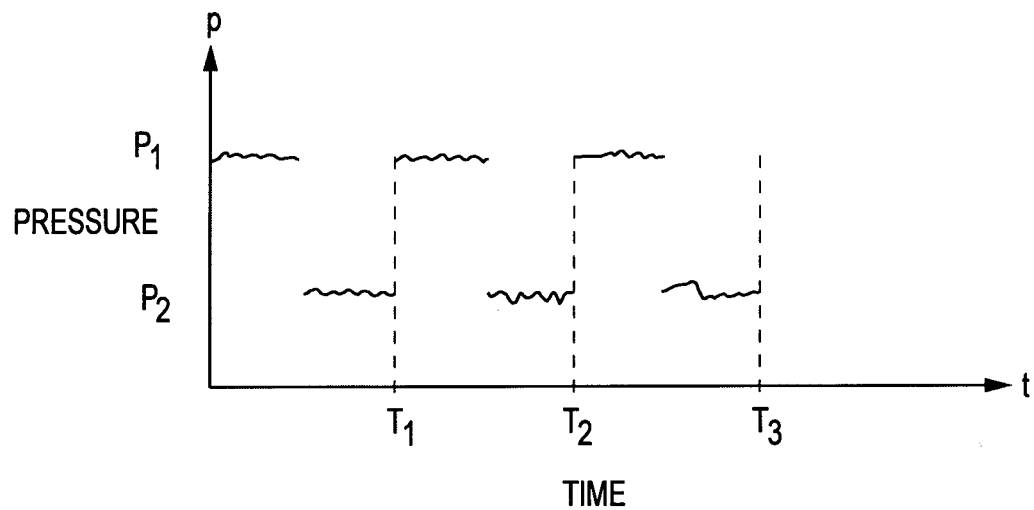
FIG. 9 is a graph of single-sided pressure measurements P1 and P2 over time, according to the invention.

FIG. 9 is a graph of single-sided pressure measurements P1 and P2 over time, according to the invention. The pressures P1 and P2 are shown as being simple and steady for the purpose of clarity. One set of first single-sided pressure measurements and one set of second single-sided pressure measurements are produced for each valve switching time period $T_1$, $T_2$, $T_3$, etc. According to this graph, a differential pressure measurement can be subsequently generated at time periods $T_1$, $T_2$, $T_3$, and so forth. Therefore, for a valve switching period of seven seconds, for example, a differential pressure measurement can be generated every fourteen seconds.

Figure 10:
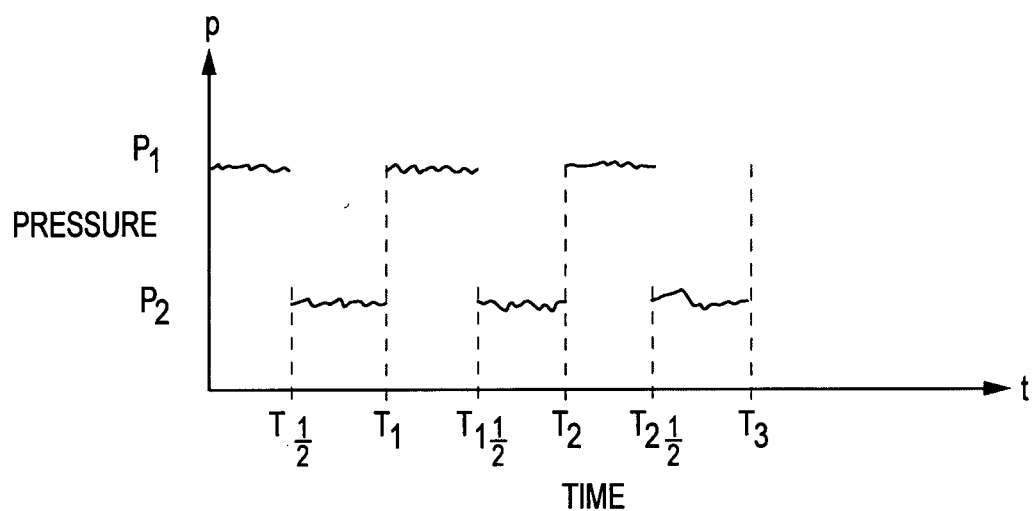
FIG. 10 is a graph of an alternate processing of the single-sided pressure measurements according to the invention.

FIG. 10 is a graph of an alternate processing of the single-sided pressure measurements according to the invention. Here, as soon as a set of second single-sided pressure measurements is obtained, a previous set of first single-sided pressure measurements can be used in order to produce a differential pressure value. Then, after a new set of first single-sided pressure measurements is subsequently obtained, the set of second single-sided pressure measurements can be used to produce a differential pressure value (the order of subtraction will have to alternate). Therefore, for a valve switching period of seven seconds, for example, a differential pressure value can be produced every seven seconds, at time periods $T_{1/2}$, $T_1$, $T_{3/2}$, $T_2$, $T_{5/2}$, $T_3$, etc.

Alternatively, the effective measurement time can be located at times other than between the two sets of pressure measurements. For example, the effective measurement time could be during one of the two readings, wherein a first pressure value is obtained or interpolated from the current set of pressure measurements and the other pressure value is extrapolated from the other set of pressure measurements.

We claim:

1. A differential pressure sensor (105) for determining a differential pressure value, the differential pressure sensor (105) comprising:
    a selector valve (110) configured to receive a first pressure at a first location and a second pressure at a second location that is spaced-apart from the first location;
    a single-sided pressure sensor (120) coupled to the selector valve (110) and receiving either the first pressure or the second pressure; and
    a processing system (130) coupled to the single-sided pressure sensor (120) and configured to receive one or more first single-sided pressure measurements from the single-sided pressure sensor (120), subsequently receive one or more second single-sided pressure measurements from the single-sided pressure sensor (120), and generate the differential pressure value from the one or more first single-sided pressure measurements and the one or more second single-sided pressure measurements.

2. The differential pressure sensor (105) of claim 1, with the selector valve (110) comprising a three port, two-way (3/2) selector valve (110).

3. The differential pressure sensor (105) of claim 1, with the selector valve (110) comprising one or more valves.

4. The differential pressure sensor (105) of claim 1, wherein the differential pressure sensor (105) comprises a component of a fluid flow meter (100).

5. The differential pressure sensor (105) of claim 1, wherein the processing system (130) is further configured to control operation of the selector valve (110).

6. The differential pressure sensor (105) of claim 1, with the processing system (130) being configured to determine a first absolute pressure value from the one or more first single-sided pressure measurements, determine a second absolute pressure value from the one or more second single-sided pressure measurements, and generate the differential pressure value from the first absolute pressure value and the second absolute pressure value.

7. The differential pressure sensor (105) of claim 1, with the processing system (130) being configured to process the one or more first single-sided pressure measurements to generate a first best-fit curve, process the one or more second single-sided pressure measurements to generate a second best-fit curve, and generate the differential pressure value from the first best-fit curve and the second best-fit curve.

8. The differential pressure sensor (105) of claim 1, with the processing system (130) being configured to process the one or more first single-sided pressure measurements to generate a first best-fit curve, process the one or more second single-sided pressure measurements to generate a second best-fit curve, extrapolate a first absolute pressure value at a time point from the first best-fit curve, extrapolate a second absolute pressure value substantially at the time point from the second best-fit curve, and generate the differential pressure value from the first absolute pressure value and the second absolute pressure value.

9. The differential pressure sensor (105) of claim 1, with the processing system (130) being configured to process the one or more first single-sided pressure measurements to generate a first best-fit curve, process the one or more second single-sided pressure measurements to generate a second best-fit curve, extrapolate a first absolute pressure value at a first time point from the first best-fit curve, extrapolate a second absolute pressure value at a predetermined second time point from the second best-fit curve, wherein the first time point is within a predetermined time range of the second time point, and generate the differential pressure value from the first absolute pressure value and the second absolute pressure value.

10. The differential pressure sensor (105) of claim 1, with the processing system (130) being configured to determine and discard outliers in the one or more first single-sided pressure measurements to produce one or more processed first single-sided pressure measurements, statistically process the one or more processed first single-sided pressure measurements to determine a first best-fit curve, determine and discard outliers in the one or more second single-sided pressure measurements to produce one or more processed first single-sided pressure measurements, statistically process the one or more processed second single-sided pressure measurements to determine a second best-fit curve, extrapolate a first absolute pressure value at a time point from the first best-fit curve, extrapolate a second absolute pressure value substantially at the time point from the second best-fit curve, and generate the differential pressure value from the first absolute pressure value and the second absolute pressure value.

11. The differential pressure sensor (105) of claim 1, with the processing system (130) being configured to determine and discard outliers in the one or more first single-sided pressure measurements to produce one or more processed first single-sided pressure measurements, statistically process the one or more processed first single-sided pressure measurements to determine a first best-fit curve, determine and discard outliers in the one or more second single-sided pressure measurements to produce one or more processed first single-sided pressure measurements, statistically process the one or more processed second single-sided pressure measurements to determine a second best-fit curve, extrapolate a first absolute pressure value at a first time point from the first best-fit curve, extrapolate a second absolute pressure value at a predetermined second time point from the second best-fit curve, wherein the first time point is within a predetermined time range of the second time point, and generate the differential pressure value from the first absolute pressure value and the second absolute pressure value.

12. The differential pressure sensor (105) of claim 1, with the generating further comprising:
    inferring first trend data from the one or more first single-sided pressure measurements and inferring second trend data from the one or more second single-sided pressure measurements; and
    using the first trend data and the second trend data in generating the differential pressure value.

13. A method for determining a differential pressure value, the method comprising:
    measuring one or more first single-sided pressure measurements;
    subsequently measuring one or more second single-sided pressure measurements, with the one or more first single-sided pressure measurements and the one or more second single-sided pressure measurements being measured by a single single-sided pressure sensor; and
    generating the differential pressure value from the one or more first single-sided pressure measurements and the one or more second single-sided pressure measurements.

14. The method of claim 13, with the generating further comprising:
   determining a first absolute pressure value from the one or more first single-sided pressure measurements;
   determining a second absolute pressure value from the one or more second single-sided pressure measurements; and
   generating the differential pressure value from the first absolute pressure value and the second absolute pressure value.

15. The method of claim 13, with the generating further comprising:
   processing the one or more first single-sided pressure measurements to generate a first best-fit curve;
   processing the one or more second single-sided pressure measurements to generate a second best-fit curve; and
   generating the differential pressure value from the first best-fit curve and the second best-fit curve.

16. The method of claim 13, with the generating further comprising:
   processing the one or more first single-sided pressure measurements to generate a first best-fit curve;
   processing the one or more second single-sided pressure measurements to generate a second best-fit curve;
   extrapolating a first absolute pressure value at a time point from the first best-fit curve;
   extrapolating a second absolute pressure value substantially at the time point from the second best-fit curve; and
   generating the differential pressure value from the first absolute pressure value and the second absolute pressure value.

17. The method of claim 13, with the generating further comprising:
   processing the one or more first single-sided pressure measurements to generate a first best-fit curve;
   processing the one or more second single-sided pressure measurements to generate a second best-fit curve;
   extrapolating a first absolute pressure value at a first time point from the first best-fit curve;
   extrapolating a second absolute pressure value at a predetermined second time point from the second best-fit curve, wherein the first time point is within a predetermined time range of the second time point; and
   generating the differential pressure value from the first absolute pressure value and the second absolute pressure value.

18. The method of claim 13, with the generating further comprising:
   determining and discarding outliers in the one or more first single-sided pressure measurements to produce one or more processed first single-sided pressure measurements;
   statistically processing the one or more processed first single-sided pressure measurements to determine a first best-fit curve;
   determining and discarding outliers in the one or more second single-sided pressure measurements to produce one or more processed first single-sided pressure measurements;
   statistically processing the one or more processed second single-sided pressure measurements to determine a second best-fit curve;
   extrapolating a first absolute pressure value at a time point from the first best-fit curve;
   extrapolating a second absolute pressure value substantially at the time point from the second best-fit curve; and
   generating the differential pressure value from the first absolute pressure value and the second absolute pressure value.

19. The method of claim 13, with the generating further comprising:
   determining and discarding outliers in the one or more first single-sided pressure measurements to produce one or more processed first single-sided pressure measurements;
   statistically processing the one or more processed first single-sided pressure measurements to determine a first best-fit curve;
   determining and discarding outliers in the one or more second single-sided pressure measurements to produce one or more processed first single-sided pressure measurements;
   statistically processing the one or more processed second single-sided pressure measurements to determine a second best-fit curve;
   extrapolating a first absolute pressure value at a first time point from the first best-fit curve;
   extrapolating a second absolute pressure value at a predetermined second time point from the second best-fit curve, wherein the first time point is within a predetermined time range of the second time point; and
   generating the differential pressure value from the first absolute pressure value and the second absolute pressure value.

20. The method of claim 13, with the generating further comprising:
   inferring first trend data from the one or more first single-sided pressure measurements and inferring second trend data from the one or more second single-sided pressure measurements; and
   using the first trend data and the second trend data in generating the differential pressure value.

21. A method for determining a differential pressure value, the method comprising:
   measuring a plurality of first absolute pressures;
   subsequently measuring a plurality of second absolute pressures, with the plurality of first absolute pressures and the plurality of second absolute pressures being measured by a single single-sided pressure sensor;
   determining a first absolute pressure value from the plurality of first single-sided pressure measurements;
   determining a second absolute pressure value from the plurality of second single-sided pressure measurements; and
   generating the differential pressure value from the first absolute pressure value and the second absolute pressure value.

22. The method of claim 21, with the generating further comprising:
   processing the plurality of first single-sided pressure measurements to generate a first best-fit curve;
   processing the plurality of second single-sided pressure measurements to generate a second best-fit curve; and
   generating the differential pressure value from the first best-fit curve and the second best-fit curve.

23. The method of claim 21, with the generating further comprising:
   processing the plurality of first single-sided pressure measurements to generate a first best-fit curve;
   processing the plurality of second single-sided pressure measurements to generate a second best-fit curve;
   extrapolating a first absolute pressure value at a time point from the first best-fit curve;

extrapolating a second absolute pressure value substantially at the time point from the second best-fit curve; and
generating the differential pressure value from the first absolute pressure value and the second absolute pressure value.

24. The method of claim 21, with the generating further comprising:
processing the plurality of first single-sided pressure measurements to generate a first best-fit curve;
processing the plurality of second single-sided pressure measurements to generate a second best-fit curve;
extrapolating a first absolute pressure value at a first time point from the first best-fit curve;
extrapolating a second absolute pressure value at a predetermined second time point from the second best-fit curve, wherein the first time point is within a predetermined time range of the second time point; and
generating the differential pressure value from the first absolute pressure value and the second absolute pressure value.

25. The method of claim 21, with the generating further comprising:
determining and discarding outliers in the plurality of first single-sided pressure measurements to produce a plurality of processed first single-sided pressure measurements;
statistically processing the plurality of processed first single-sided pressure measurements to determine a first best-fit curve;
determining and discarding outliers in the plurality of second single-sided pressure measurements to produce a plurality of processed first single-sided pressure measurements;
statistically processing the plurality of processed second single-sided pressure measurements to determine a second best-fit curve;
extrapolating a first absolute pressure value at a time point from the first best-fit curve;
extrapolating a second absolute pressure value substantially at the time point from the second best-fit curve; and
generating the differential pressure value from the first absolute pressure value and the second absolute pressure value.

26. The method of claim 21, with the generating further comprising:
determining and discarding outliers in the plurality of first single-sided pressure measurements to produce a plurality of processed first single-sided pressure measurements;
statistically processing the plurality of processed first single-sided pressure measurements to determine a first best-fit curve;
determining and discarding outliers in the plurality of second single-sided pressure measurements to produce a plurality of processed first single-sided pressure measurements;
statistically processing the plurality of processed second single-sided pressure measurements to determine a second best-fit curve;
extrapolating a first absolute pressure value at a first time point from the first best-fit curve;
extrapolating a second absolute pressure value at a predetermined second time point from the second best-fit curve, wherein the first time point is within a predetermined time range of the second time point; and
generating the differential pressure value from the first absolute pressure value and the second absolute pressure value.

27. The method of claim 21, with the generating further comprising:
inferring first trend data from the one or more first single-sided pressure measurements and inferring second trend data from the one or more second single-sided pressure measurements; and
using the first trend data and the second trend data in generating the differential pressure value.

28. A method for determining a differential pressure value, the method comprising:
measuring a plurality of first absolute pressures;
subsequently measuring a plurality of second absolute pressures, with the plurality of first absolute pressures and the plurality of second absolute pressures being measured by a single single-sided pressure sensor;
generating a first best-fit curve from the plurality of first single-sided pressure measurements and using the first best-fit curve to determine a first absolute pressure value;
generating a second best-fit curve from the plurality of second single-sided pressure measurements and using the second best-fit curve to determine a second absolute pressure value; and
generating the differential pressure value from the first absolute pressure value and the second absolute pressure value.

29. The method of claim 28, with generating the first and second best-fit curves further comprising:
extrapolating a first absolute pressure value at a time point from the first best-fit curve; and
extrapolating a second absolute pressure value substantially at the time point from the second best-fit curve.

30. The method of claim 28, with generating the first and second best-fit curves further comprising:
extrapolating a first absolute pressure value at a first time point from the first best-fit curve; and
extrapolating a second absolute pressure value at a predetermined second time point from the second best-fit curve, wherein the first time point is within a predetermined time range of the second time point.

31. The method of claim 28, with the generating further comprising:
determining and discarding outliers in the plurality of first single-sided pressure measurements to produce a plurality of processed first single-sided pressure measurements before generating the first best-fit curve;
determining and discarding outliers in the plurality of second single-sided pressure measurements to produce a plurality of processed first single-sided pressure measurements before generating the second best-fit curve;
extrapolating the first absolute pressure value at a time point from the first best-fit curve; and
extrapolating the second absolute pressure value substantially at the time point from the second best-fit curve.

32. The method of claim 28, with the generating further comprising:
determining and discarding outliers in the plurality of first single-sided pressure measurements to produce a plurality of processed first single-sided pressure measurements before generating the first best-fit curve;
determining and discarding outliers in the plurality of second single-sided pressure measurements to produce a plurality of processed first single-sided pressure measurements before generating the second best-fit curve;

extrapolating a first absolute pressure value at a first time point from the first best-fit curve; and extrapolating a second absolute pressure value at a predetermined second time point from the second best-fit curve, wherein the first time point is within a predetermined time range of the second time point.

33. The method of claim 28, with the generating further comprising:

inferring first trend data from the one or more first single-sided pressure measurements and inferring second trend data from the one or more second single-sided pressure measurements; and using the first trend data and the second trend data in generating the differential pressure value.

* * * * *